(No Model.)

J. W. HOARD.
Carbureter.

No. 236,433.                    Patented Jan. 11, 1881.

Witnesses.
Harry S. Martin
Saml R. Turner

Inventor:
John W. Hoard
by John I. Halsted, his Att'y

UNITED STATES PATENT OFFICE.

JOHN W. HOARD, OF PROVIDENCE, RHODE ISLAND.

CARBURETER.

SPECIFICATION forming part of Letters Patent No. 236,433, dated January 11, 1881.

Application filed September 16, 1880. (No model.)

*To all whom it may concern:*

Be it known that I, JOHN W. HOARD, of Providence, in the county of Providence and State of Rhode Island, have invented certain new and useful Improvements in Carbureters; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My present invention consists in a novel construction of apparatus for carbureters, the nature and character of which will be apparent from the following description.

Figure 1:
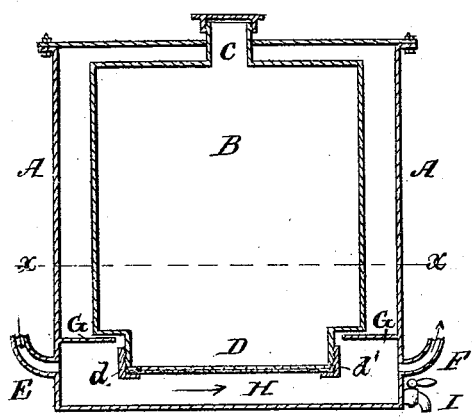
Figure 2:
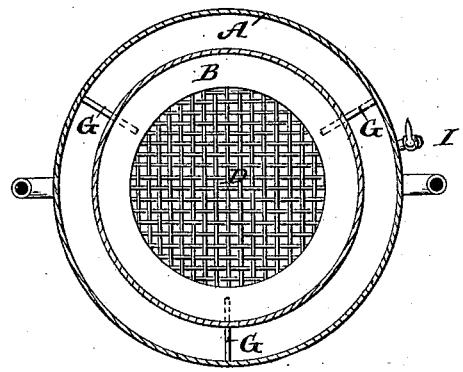
Figure 3:
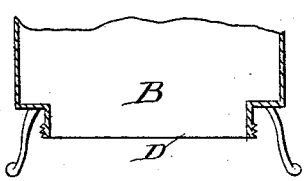
Figure 4:
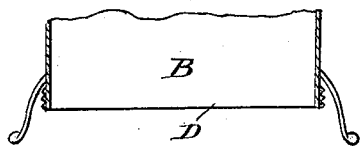

Figure 1 is a vertical section of an apparatus serving to illustrate my invention; Fig. 2, a horizontal section of the same through the line $x\ x$; Figs. 3 and 4, partial views of the hydrocarbon-chamber resting on legs, and Figs. 5 and 6 modifications.

Within an outer case or box, A, is hung or upheld the vessel or chamber B for holding the hydrocarbon or liquid for carbureting the gas or air to be charged. This chamber B has a filling-mouth, C, at its top, through which the liquid is poured in to fill this chamber full. The bottom D of this chamber, instead of being solid, is covered either with a piece of fibrous material—as, for instance, felt cloth—or with a fine wire mesh, or with both, and such covering, while preventing the body of the liquid being exposed directly to contact with the gas or air to be carbureted, serves, nevertheless, to keep itself sufficiently moistened by the liquid held up by it to carburet the gas or air which may come or pass beneath it. Beneath the vessel or chamber B, by means of an inlet, E, the gas or air is conducted, to be carbureted, into a carbureting-chamber, H, and after passing beneath the bottom D it finds its exit at F, and is thence led in a well-known manner, by proper pipe-connections, to the point where it is to be burned. The filling-mouth C should have an air-tight removable cap or cover.

The top of the box or outer chamber, A, may be removable in order readily to admit the introduction or removal therefrom of the hydrocarbon-chamber B, and may be secured in any desirable manner—as, for instance, by flanges and nuts and screws. The vessel B must have its bottom raised sufficiently to permit the passage under it of the gas or air to be carbureted, and this may be done by permitting it to rest or hang on any appropriate projections, G, on the inner side of the outer box or case, A, or it may have legs for its support, projecting downward.

I prefer to use the wire cloth or mesh inside and the cloth outside when both are used together. The wire-cloth, besides acting as a mesh, avoids all danger of explosion, adds to the strength of the cover, and the cloth, being on the outside, is the better of the two materials for keeping moist on its outer side for the passing gas to act upon it and to take up and be charged with such saturated hydrocarbon. By this construction there is no flowing stream of hydrocarbon, notwithstanding the only outlet for the same is directly in the bottom of the vessel. There is no direct contact of any free hydrocarbon with the gas or air. The hydrocarbon liquid is all confined or inclosed, and the chamber containing it has not even a hole of any size through which the smallest stream could pass. As the moisture on the outer surface of the porous covering D is taken up and carried off by the gas or air, the supply of the liquid in B gradually diminishes until all is consumed, and during the whole period of its consumption only a limited desired amount of the liquid is exposed, and even this limited amount is held in suspension or saturation, so that the gas comes only in contact with the moistened covering on the bottom D, and not in direct contact with even a surface of free liquid, the felt, or wire, or other covering being always interposed between the body of the liquid and the gas to be carbureted.

It will be further observed that any foreign matter that may pass in with the gas can do no harm, and cannot get into the liquid-chamber B, nor can it clog the bottom of that chamber in any way. Any ordinary opening or cock, I, will suffice to draw off any such matter that might collect in the gas passage or chamber H beneath the chamber B.

Instead of cloth or wire, or both, as a covering for the bottom of the chamber B, any equivalent material may be used which will prevent the flow of the liquid, and which has yet sufficient porosity to take up and hold it and allow it to work through it, and to keep its outer or lowermost surface continuously moistened—as, for instance, pasteboard or any heavy absorbing paper, porous stone, or earthenware, or a material made of a compound of potter's or earthenware clay and of sawdust or other matter which is easily burned out in the act of burning or baking the ware, such burning out leaving the ware sufficiently porous.

The diaphragm or bottom covering, D, may be held to the vessel B by means of a threaded band or ring, d, or by any well-known or equivalent means; and, if desired, a rubber or other washer or band may be employed to aid in making a tight connection or joint.

The apparatus may be made of any suitable material, such as cast or sheet metal, and of any size or shape preferred.

Figure 5:
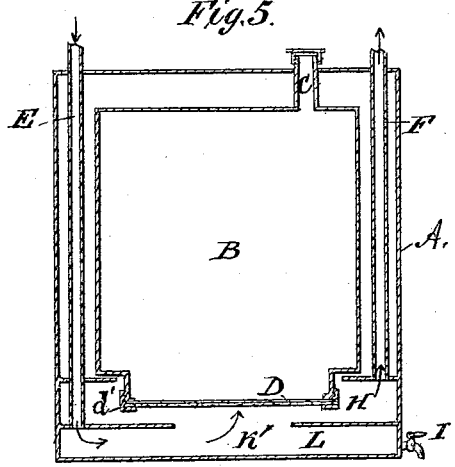
Figure 6:
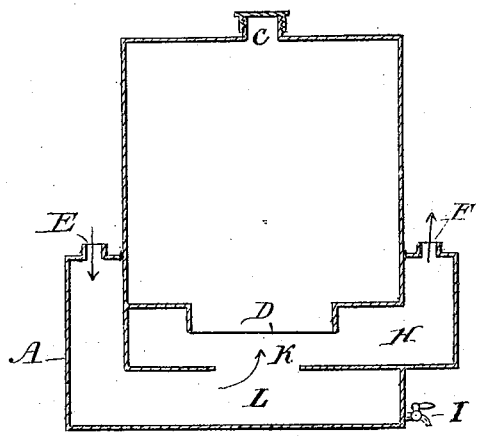

In Figs. 5 and 6 I show modifications in which the gas is conveyed more directly against the diaphragm D by passing first beneath the floor which is under such diaphragm, an opening, K, being made in this floor just below the diaphragm to admit the gas to it. The principle is the same as above described, but the body of the gas is guided more positively upon the diaphragm. Any deposit from the gas would thus collect in compartment L, and not in H. In these figures the gas-inlet pipe leads into L and the gas-outlet pipe leads out from H. In Fig. 6 the upper part of the pot or case A is dispensed with.

I claim—

A gas and air carbureter consisting of a cylinder or outer case in which are one or more closed hydrocarbon chambers or vessels containing liquid hydrocarbon, having their bottoms made of porous material, as described, in combination with a carbureting-chamber beneath the same having an appropriate inlet and outlet.

JOHN W. HOARD.

Witnesses:
GILMAN E. JOPP,
THOS. A. MILLETT.